Nov. 22, 1938.    M. LA LONDE    2,137,991

BRAKE

Filed Sept. 7, 1937

INVENTOR.
Moses LaLonde
BY
Walter C. Ron
ATTORNEY.

Patented Nov. 22, 1938

2,137,991

UNITED STATES PATENT OFFICE 2,137,991

BRAKE

Moses La Londe, Springfield, Mass.; assignor of five-sixteenths to Patrick Haggerty, five-sixteenths to John J. Bannon, and five-sixteenths to Harry Bradt; Charles V. Ryan, Jr., administrator of said Moses La Londe, deceased Application September 7, 1937, Serial No. 162,596

2 Claims. (Cl. 188—106)

This invention relates to improvements in brake mechanism and is directed particularly to the provision of a novel brake of the hydraulic type adapted for use in motor vehicles of all kinds.

The principal objects of the invention are directed to the provision of a novel brake mechanism for use in motor vehicles and the like which is both simple in form so as to be economical to manufacture and which is at the same time efficient and positive in its operation.

According to special features of the invention, the brake, operated by hydraulic pressure, includes a pair of similar braking elements and parts connecting and actuating the same which are arranged so that substantially equal pressure is applied to the said braking elements whereby they operate to apply substantially equal braking pressure to the brake drum.

It is another object of the invention to provide a brake of the hydraulic type which may be manually operated, as by means of a hand brake, so that the braking elements are set or held with a predetermined degree of pressure.

Various other novel features and advantages of the invention will become more apparent after a reading of the following description which is taken in connection with the accompanying drawing, wherein.

Figure 1:
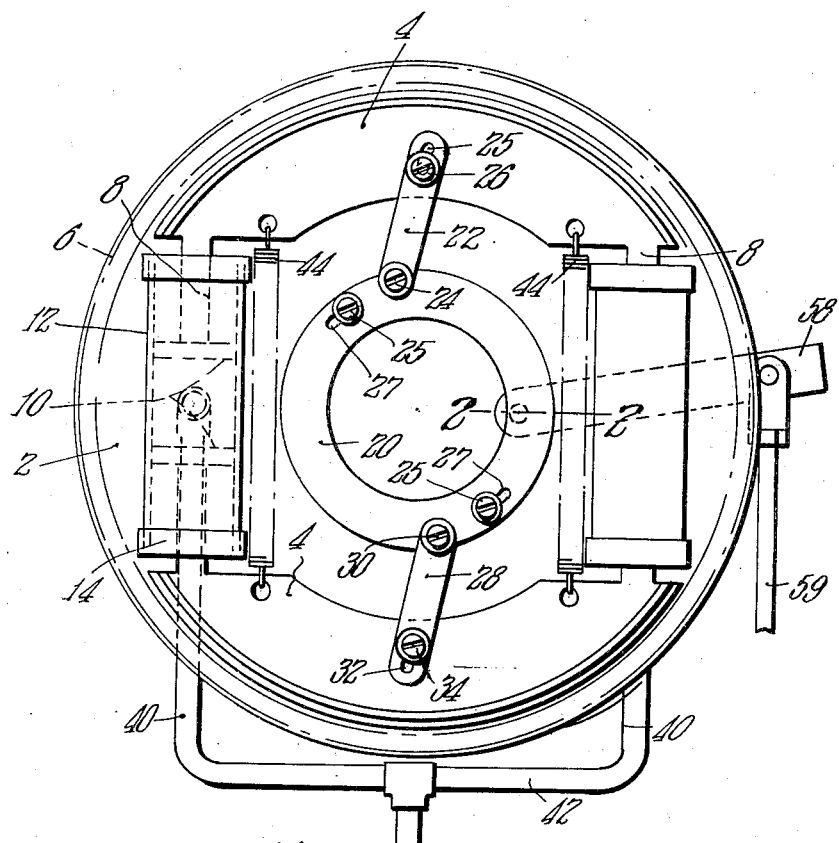
Fig. 1 is an elevational view showing a brake mechanism of the invention associated with a support therefor.
Figure 3:
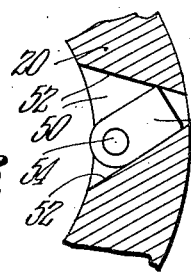
Fig. 3 is a sectional view on the line 3—3 of Fig. 2.
Figure 2:
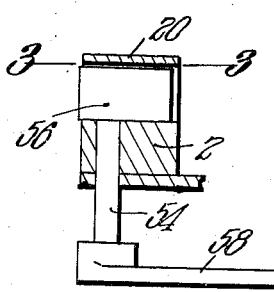
Fig. 2 is sectional elevational view on the line 2—2 of Fig. 1 to explain certain features of construction.

Referring now to the drawing more in detail, the invention will be fully described.

At 2 is represented a support with which the brake proper is associated and similar braking elements 4 are movable relative thereto. The support is, of course, associated with the vehicle. It will be understood that the wheel carries a brake drum of usual form, indicated by 6 in Fig. 1.

The elements 4 are generally semi-circular and carry on opposite ends inwardly-extending parts 8. These parts may be integral with the members 4, if desired, or may be separate parts attached thereto.

Each part 8 has a piston 10 on its inner end and there is a pair of cylinders 12 in which the adjacent pistons are slidable. The construction at both sides of the brake is the same as regards the piston and cylinder arrangement and therefore is only shown in detail at the left-hand side of Fig. 1.

If desired, there may be apertured cap members 14 on opposite ends of the cylinders and these may be of some resilient packing material to prevent leakage of fluid from the cylinders.

A plate member 20 is rotatably supported on part 2 between the elements 4 and between the cylinders 12. A link 22 has one end secured to the plate 20 as by bolt 24 and its other end is slotted at 25. A bolt 26 extends through the slot and into one of the braking elements 4.

A similar link 28 is secured, as by a bolt 30, to an opposite side of plate 20 and its other end is slotted at 32. A bolt 34 extends through the slot and into the other braking element, all as shown.

The pressure may be supplied the cylinder 12 for actuating the pistons 10 by means of suitable pipes 40 which are connected to the supply by another pipe 42. Pressure is supplied by means operated by the usual foot-pedal.

Preferably there is a pair of springs 44 extending between the braking elements 4 as shown. These are for urging the members 4 inwardly towards one another after the hydraulic pressure is released.

The under side of plate 20 is provided with a slot 50 having angularly arranged cam surfaces 52 as shown. A shaft 54 is rotatable in support 2 and has a cam member 56 on one end disposed in the slot 50.

A lever 58 is attached to the other end of shaft 54. Thus by moving the lever 58 the shaft 54 is rotated causing cam member 56 to bear against the cam surfaces 52 and rotate plate 20.

In this way, by swinging lever 58, the plate 20 is rotated so as to act upon the links which in turn urge the braking elements outwardly against the brake drum. It will be appreciated that the cam member 56 is confined entirely within the slot 50 and acts positively on the plate. The lever may be connected by a rod 59 to a band lever so that by operation of the lever the brake elements are operated. Thus by the usual foot lever the brake elements are operated while in addition they are operated manually.

While I have described the invention with great detail in reference to the form at present preferred, it is not desired to be limited thereto but, if at all, by the appended claims. What is claimed is:

1. The combination with a support and relatively rotatable brake drum of braking means comprising, separate similar drum engaging brake elements, a pair of cylinders on said support spaced apart and disposed between opposite ends of said elements, pistons in said cylinders, connections between the end of each element and a piston, a rotatable member guided for rotation on said support between said elements and cylinders, actuating members, pivotal connections between said rotatable member and one end of said actuating members, slidable and pivotal connections between actuating members and elements, and means to rotate said rotatable member, all adapted and arranged whereby said elements may be moved relatively and simultaneously outward into braking positions by said pistons without rotation of said rotatable member or said elements may be moved outwardly by rotation of said rotatable member.

2. The combination with a support and relatively rotatable brake drum of braking means comprising, separate similar drum engaging brake elements, a pair of cylinders on said support spaced apart and disposed between opposite ends of said elements, pistons in said cylinders, connections between the end of each element and a piston, a rotatable member guided for rotation on said support between said elements and cylinders, actuating members, pivotal connections between said rotatable member and one end of said actuating members, slidable and pivotal connections between said actuating members and elements, means to rotate said rotatable member, all adapted and arranged whereby said elements may be moved relatively and simultaneously outward into braking positions by said pistons without rotation of said rotatable member or said elements may be moved outwardly by rotation of said rotatable member, and springs connecting opposite ends of one of the said elements to adjacent opposite ends of the other element.

MOSES LA LONDE.